June 26, 1962   J. G. RAFFAELLI   3,040,399
SAFETY CONTROL SYSTEMS FOR MACHINES
Filed April 22, 1960   2 Sheets-Sheet 2

INVENTOR.
JOSEPH G. RAFFAELLI
BY
ATTORNEYS.

United States Patent Office 3,040,399
Patented June 26, 1962

3,040,399
SAFETY CONTROL SYSTEMS FOR MACHINES
Joseph G. Raffaelli, Bell, Calif., assignor to General Controls Co., Glendale, Calif., a corporation of California
Filed Apr. 22, 1960, Ser. No. 24,011
8 Claims. (Cl. 22—68)

The present invention relates to safety control systems for machines of various types and, as shown and described herein, is particularly useful in the safe operation of die casting machines.

Briefly, the present invention involves the provision of two manually operable control elements spaced sufficient distance apart to require the machine operator to use both hands to operate the same for purposes of initiating operation of the machine. An important feature of the present invention is that operation of the machine is not initiated unless both of such controls are manually operated substantially simultaneously or within a second in time of each other to assure prevention of accidental operation and to assure positioning of the machine operator's hands out of harm's way. Another feature of the present invention is that once the operation of the machine is initiated only under the condition mentioned above, the machine operator may then use one of his hands for other useful purposes such as, for example, in ladling the shot or die cast material.

It is therefore a general object of the present invention to provide a safety control system of this character having one or both of the features indicated above.

Another object of the present invention is to provide a safety control system of this character for die casting machines which incorporates two manual controls which are time interlocked such that one of such controls is required to be manually maintained until the die is closed or locked while the other of one of such controls is required to have been actuated within one second to achieve the initial movement of a die element towards its closed position.

Another object of the present invention is to provide a control system of this character which initially requires both hands of the machine operator to initiate a die closing operation after which one of the operator's hands may be used to ladle die cast material.

Another object of the present invention is to provide a system of the character indicated in the previous paragraph in which the die automatically opens should the machine operator release one of the controls prior to the time that the die is completely closed, thereby requiring the cycle of die closing to be re-initiated with both hands of the operator.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

The invention is described in conjunction with a die casting machine since the same is particularly useful therein but it will be appreciated by those skilled in the art that the invention in its broader aspects is applicable to machines of other types.

Figure 1:
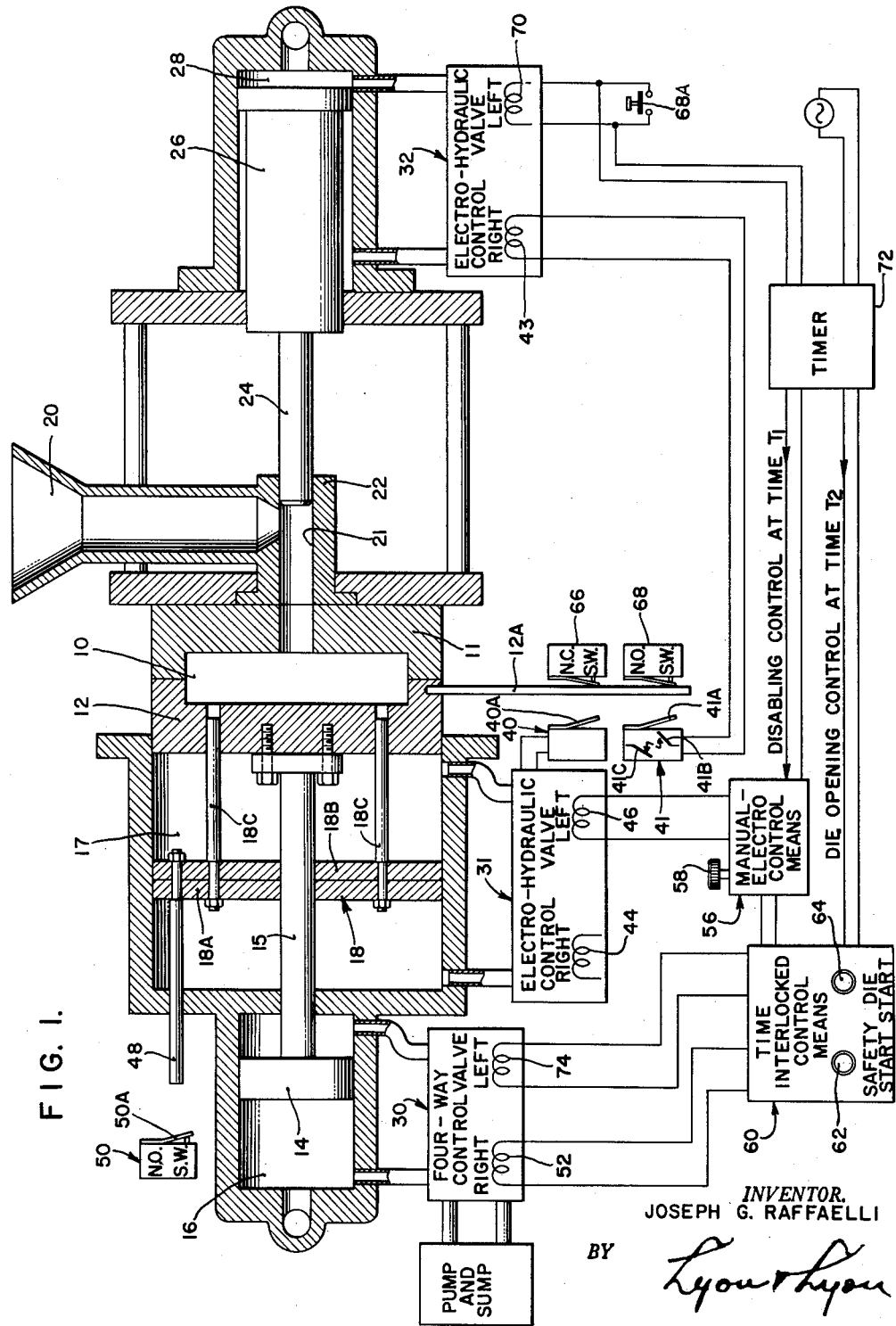
FIGURE 1 illustrates partly in structural and partly in schematic form a control system embodying features of the present invention.

Referring to the structural arrangement in the upper part of FIGURE 1, elements of a conventional die casting machine are illustrated and the same includes a die cavity 10 defined by a fixed die member 11 and a cooperating movable die member 12.

The die member 12 is hydraulically operated between its open and closed positions by a conventional hydraulic control system which includes a double-acting piston 14 attached through rod 15 to die member 12, the piston 14 being movable in its fluid cylinder 16 and, as illustrated, the die member 12 may be partly guided in the enlarged cylinder 17 to form an end wall for such cylinder 17 within which the ejector piston 18 is independently slidable. This ejector piston 18 is illustrated as comprising two discs 18A and 18B for mounting a plurality of so-called knock-out or ejector pins 18C which may pass through apertured portions of die member 12 for the conventional purpose of dislodging or ejecting the molded material from die member 12 after the die cavity is opened.

Die cast material or shot is fed or ladled into the machine through the feed spout 20 which has its lower end in communication with the bore 21 in stationary cylindrical portion 22, such bore 21 extending through the stationary die member 11 into the die cavity 10. A hydraulically operated piston or plunger 24 is movable in such bore 21 to force, in conventional manner, the molten die cast material under pressure into the cavity 10. This plunger 24 is an extension of the double-acting piston 26 which is movable in its stationary fluid cylinder 28.

Conventional electrohydraulic control systems 30, 31 and 32 respectively, each incorporating solenoid-operated four-way fluid-control valves and associated pump and sump means, are illustrated for purposes of operating independently the corresponding double-acting pistons 14, 18 and 26 and it is appreciated that other means may be used to effect independent reciprocatory movements of the die moving piston 14, the knock-out or ejector piston 18 and the plunger 24.

In order to perhaps better understand the operation of the safety control system circuitry described hereinafter, the sequence of events accomplished by the structure previously described is now briefly described.

It is assumed for this purpose that a die cast object had been previously formed and ejected from the machine so that initially the movable die member 12 is in its fully open position, i.e. its actuating piston 14 is in its furthermost left position and further that the ejector piston 18 is in its furthermost right position with the ejector pins 18C extending through the apertured portions of die member 12; and further that the plunger 24 is in its position shown in FIGURE 1.

Under these assumed conditions, the switches 40 and 41 have their corresponding actuating arms 40A and 41A engaged by a means responsive to the position of die member 12, illustrated herein as the arm 12A extending from the die member 12, for maintaining such switches 40 and 41 in a particular operating condition. Briefly, as explained in more detail below, such operation of switch 41 by arm 12A resulted in energization of the solenoid winding 43 in control unit 32 to have caused the piston 26 to move to the right in its position shown; and such operation of switch 40 by arm 12A resulted in energization of the solenoid winding 44 to cause the ejector piston pins 18C to eject the previously molded object.

The first sequence of events, under this initial assumed condition, involves movement of the piston ejector pins 18C to their furthermost left position prior to moving the die member 12 to its closed position. This is accomplished using manually-operated electrically-reset control means 56 which incorporates switching means operated by the manually-operated element 58 to energize the control solenoid 46 in unit 31 to thereby move the piston 18 to its furthermost left position in cylinder 17; and when this is thus accomplished, means responsive to the position of piston 18, illustrated herein as a rod 48 extending sealingly out of cylinder 17, engages the actuating member 50A of switch 50 to actuate the same to condition an energizing circuit for the valve control solenoid 52 in unit 30. Also, when the manually-controlled element 58 is operated as described above, the same switching means in unit 56 serves to condition a die-closing energizing circuit for the time interlocked control means 60.

This time interlocked control means 60 embodies important features of the present invention and includes generally two spaced manually-operated control buttons 62 and 64, referred to respectively as a safety-start switch and a die-start switch, both of which are required to be operated substantially simultaneously in order to initiate a die closing operation. These buttons 62 and 64 are spaced to require the machine operator's two hands to effect such substantially simultaneous operation.

When these buttons 62 and 64 are substantially simultaneously operated under these conditions, the solenoid 52 in unit 30 is energized to move the die 12 to the right, i.e. to die-closing position, the ejector piston 18 remaining stationary. When the die cavity 10 is thus closed, the two control switches 66 and 68 are actuated, the switch 66 serving to interrupt an energizing circuit for the die-closing solenoid 52 and the switch 68 serving to close a holding or die-locking circuit, all as described later in connection with FIGURE 2.

When the die cavity 10 is thus closed, shot is ladled into the spout 20 and the same is then forced under pressure into such cavity 10 by manually closing the ram or plunger switch 68A which results in energization of solenoid winding 70 by current source S in unit 32 to move the shot piston 26 to the left; and also simultaneously closing of switch 68A sets into operation the timer circuit 72.

After the timer 72 has been operated for a predetermined time T₁, the previously manually set control means 56 is reset to de-energize solenoid 46 and to interrupt the previously indicated conditioning circuit associated with control means 60. Thereafter, at a time T₂ the timer 72 is effective to close a die-opening circuit associated with control means 60 to cause energization of the solenoid 74 in unit 30 to return the die 12 to the left to its open position. When the die 12 reaches its fully open position, switch 40 is operated to correspondingly produce energization of solenoid 44 in unit 31 to move the ejector piston 18 to the right to eject the molded piece from die 12; and also switch 41 is operated at this time to return the shot piston 26 to the right in its position shown in FIGURE 1, thereby restoring the machine for the next succeeding die-forming operation.

The timer 72 is of conventional construction and is provided generally to provide some predetermned time delay after loading of the shot for the quenching or curing of the die casting while the same is in the closed cavity 10.

Figure 2:
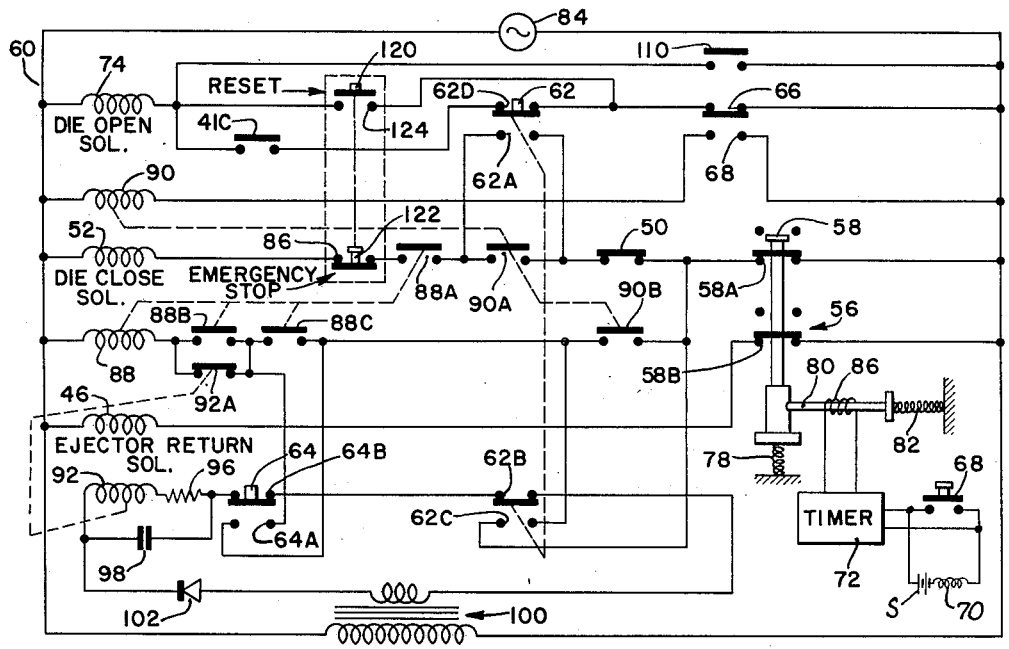
FIGURE 2 illustrates more details of the system shown in FIGURE 1 and particularly the two control element safety circuit embodying features of the present invention.

Referring now to FIGURE 2, the control means 60 shown in FIGURE 1 includes the two manually-operated safety switch buttons 62 and 64, both of which are required to be operated substantially simultaneously by different ones of the operator's hands to effect a die closing operation. To condition the same for such a die closing operation, the manual control element 58, which may be foot-controlled, is required to be operated to its position shown in FIGURE 2 to condition the control means 56 also indicated in FIGURE 1.

For purposes of simplicity, such control means 56 is illustrated to include the manually-operated insulated rod 58 having electrical contactors thereon for closing respectively switches 58A and 58B and being biased upwardly by coil compression spring 78. However, these switches 58A, 58B are maintained in their actuated closed positions by detent means which includes a magnetizable rod 80 biased by coil compression spring 82 into a detent in the lower end of the control element 58. This rod 80 is withdrawn from such detent to allow the switches 58A, 58B to open upon energizing coil 86 in the manner described later.

Switch 58A closes a portion of the energizing circuit for the die closing solenoid 52 and switch 58B completes an energizing circuit to opposite terminals of the voltage source 84 for the ejector return solenoid 46 to assure retraction of the die knock-out pins 18C (FIGURE 1) prior to the die-closing operation now described. Indeed, the die-closing operation could not be performed until these knock-out pins 18C are fully withdrawn and the switch 50 (FIGURES 1 and 2) in the energizing circuit for solenoid 52 is closed.

This energizing circuit for solenoid 52 includes the serially connected source 84, solenoid 52, a normally closed emergency stop switch 86, a normally open relay switch 88A operable by a relay coil 88, a normally open relay switch 90A operable by a relay coil 90 and the previously mentioned switches 50 and 58A both of which are closed at this time. It is noted that the normally open relay switch 90A is shunted by the normally open safety start switch 62A so that switch 90A is short-circuited when the safety start button 62 is manually maintained in its actuated position. The final completion of the energizing circuit for solenoid 52 results when relay switch 88A is actuated to its closed position in the manner now described involving energization of its associated relay coil 88.

Relay coil 88 is connected in an energizing circuit which includes: the serially connected source 84; coil 88; a closed relay switch 92A operated to that condition by the energized relay coil 92 and shunted by the normally open holding relay switch 88B (the switch 88B being closed when coil 88 is energized); a normally open die start switch 64A which is closed when the die start button 64 is manually maintained in its actuated condition and which is shunted by the normally open holding relay switch 88C (the switch 88C being closed when coil 88 is energized); the normally open safety start switch 62C which is operated when the safety start button 62 is manually maintained in its actuated condition and which is shunted by the normally open holding relay switch 90B (the switch 90B being closed when relay coil 90 is energized); and the previously mentioned conditioning switch 58A which is retained in its closed position, as shown, at this time.

The relay coil 92, energized by rectified current, has a resistance of 5,000 ohms and is connected in series with a 1,000 ohm resistance 96 and the serially connected coil 92 and resistance 96 are shunted by a 100 microfarad capacitor 98 for an important purpose, namely to assure a "drop out" time for relay coil 92 in the order of one second.

The coil 92 is normally energized by a rectified current derived from the step-down transformer 100 and rectifier 102. The energizing circuit includes the following serially connected elements, namely the secondary winding of transformer 100, rectifier 102, coil 92, resistance 96, the normally closed die start switch 64B, and the normally closed safety start switch 62B.

The die-closing operation is now described. It requires that the die start button 64 be actuated simultaneously with or within one second of actuation of the safety start button 62, i.e. within the one-second drop out time of the relay having the coil 92 and associated relay switch 92A.

Thus, when the safety start button 62 is actuated, its associated switch 62B is opened to interrupt the flow of normal energizing current to coil 92. However, because of the provision of capacitor 98, the relay switch 92A remains closed for approximately one second after switch 62B is opened and it is within this one-second interval that the die start button 64 must be actuated in order that relay winding 88 becomes energized. When this condition is met, i.e. die start button 64 is actuated within this one-second time interval, and while the safety start button remains manually actuated, the relay coil 88 is then energized in the following sequence of events. Substantially simultaneous closure of switches 64A and 62C results in initial flow of current through coil 88 in the following path which includes in that order, source 84, coil 88, relay switch 92A which remains closed for only approximately one second, switch 64A, switch 62C and the previously mentioned conditioning switch 58A. This current flow through coil 88 results in closure of each of its three normally open switches 88B, 88C and 88A, the switches 88B and 88C being holding switches for continuing the flow of current through coil 88. When this condition is achieved, switches 92A and 64A are short-circuited, which means that opening of these switches 92A and 64A have no effect on the continued flow of current through coil 88, such current, however, still being maintained by continued manual closure of the safety start switch 62C which must be manually maintained for full closure of the die cavity. However, the operator need no longer use his other hand to maintain die start button 64 actuated but may use the same in ladling the shot. In this condition, the die closing solenoid 52 is energized through the now closed relay switches 88A and the safety start switch 62A and the movable die 12 (FIGURE 1) moves to its closed position; and when this closed position is reached, die position responsive switch 68 is closed to energize relay coil 90 after which the die is locked in closed position and the operator need no longer maintain the safety start button 62 in its actuated condition. This is so since energization of coil 90 causes its relay switches 90A and 90B to close to short-circuit corresponding safety start switches 62A and 62B.

Should, however, the operator fail to maintain the safety start button 62 in its actuated condition until the die cavity is closed, the movable die member 12 (FIGURE 1) returns to its fully open position under the following conditions. Release of the safety start button 62 allows the switch 62C to open to de-energize relay 88 and consequently the die close solenoid 52; also the die open solenoid 74 is then energized through a circuit which includes in that order, source 84, solenoid 74, switch 41C which is closed at this time, safety start switch 62D and switch 66. Then to again move the die member 12 towards closed position, it is again necessary to substantially simultaneously manually operate the buttons 62 and 64.

Assuming that the die cavity has been closed as previously described with the switch 68 closed and the switch 66 now open, the operator ladles the shot into the feed spout 20 (FIGURE 1) and then manually actuates the shot button 68A (FIGURES 1 and 2) to cause the plunger 24 (FIGURE 1) to force the shot under pressure into the die cavity. Closure of switch 68A results also in initiation of a timing cycle effected by conventional timer 72 (FIGURES 1 and 2) connected to such switch 68A. After a predetermined time $T_1$ established by timer 72, the solenoid 86 is energized to withdraw the plunger detent 80 to allow the previously manually-operated button 58 to return to its initial condition under the influence of spring 78 to open the switches 58A and 58B.

Opening of switch 58A interrupts the current flowing to the die close solenoid 52; and opening of switch 58B results in de-energization of ejector return solenoid 46. Later at a time $T_2$ established by timer 72, the timer 72 operates the normally open switch 110 to energize the die open solenoid with the result that the movable die member 12 (FIGURE 1) is moved to its open position. When the die member 12 is in its fully open position, switches 40 and 41 are operated by die arm 12A (FIGURE 1). Closure of switch 40A results in energization of solenoid 44 to cause the ejector pins 18C to move to the right in FIGURE 1 to eject the die cast piece from the mold; and actuation of switch 41 results in energizing solenoid 43 and returning of the shot plunger 24 to its position shown in FIGURE 1.

It will be also be observed that optionally the die 12 may be returned to the die opening position prior to complete movement of die 12 to its closing position by operating the reset button 120 which is mechanically interlocked with the emergency stop button 122. In such case the die opening solenoid 74 is energized through a circuit which includes solenoid 74, reset switch 124 and switch 66, whereupon the die member 12 moves back to its open position and when it reaches its fully open position, the die operated switch 41C is opened thus requiring operation of the safety start button 62 to initiate a die closing movement.

Figure 3:
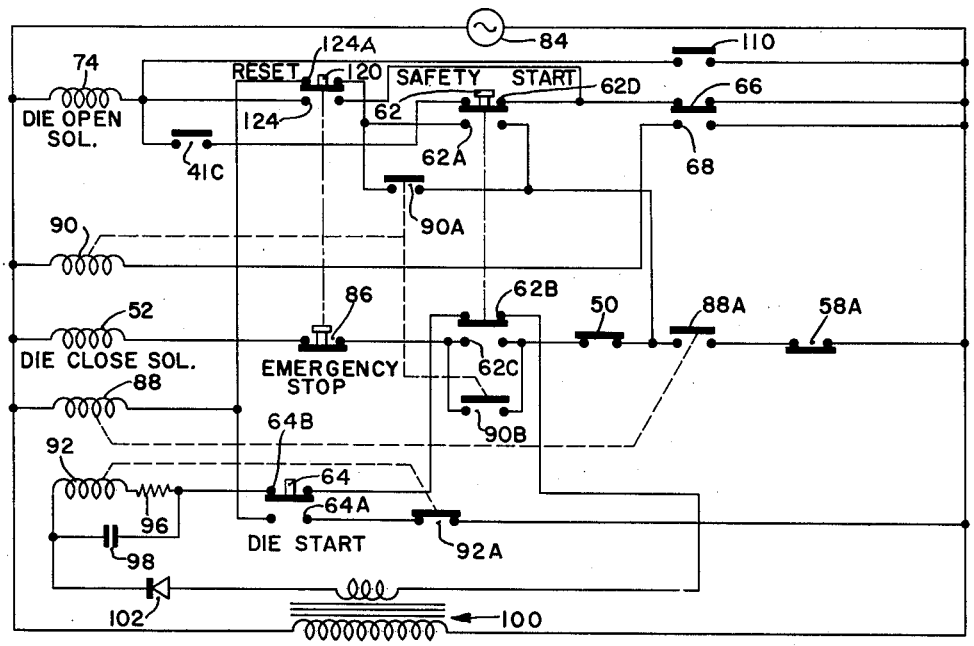
FIGURE 3 illustrates a modified form of the invention.

*Description of FIGURE 3*

FIGURE 3 shows a modified system and for purposes of ease and comparison and simplicity, corresponding elements have the same reference numerals as above and also some of the circuitry shown in FIGURE 2 is omitted from FIGURE 3.

In FIGURE 3 substantially simultaneous operation of the safety start button 62 and die start button 64 is again required to achieve a die-closing operation. The elements are shown therein in the die open position preparatory for a die closing operation.

Such operation is initiated by manually actuating the safety start button 62. When this is done, switch 62B is opened thereby opening a normally closed energizing circuit for the timing relay coil 92, such normally closed circuit including the serially connected secondary winding of transformer 100, rectifier 102, coil 92, resistance 96, die start switch 64B, and safety start switch 62B. When the current to coil 92 is thus interrupted, its one-second timing interval begins, i.e. its relay switch 92A remains closed only for one second during which time it is necessary to manually actuate the die start button 64 to achieve a die-opening operation. When the die start button 64 is actuated during this one-second time interval, a temporary energizing circuit for control relay coil 88 is established through a path which includes source 84, coil 88, die start switch 64A and relay switch 92A and this results in closing of the associated relay switch 88A that serves as a portion of a holding circuit for coil 88. This holding circuit includes, coil 88, the normally closed reset switch 124A, the now closed safety start switch 62A, relay switch 88A and the switch 58A held in its closed position as illustrated in FIGURE 2. Closure of this relay switch 88A results also in establishing an energizing circuit for the die close solenoid 52 through a path which includes source 84, solenoid 52, emergency stop switch 86, the now closed safety start switch 62C, the now closed ejector position responsive switch 50 (FIGURE 1), the relay switch 88A and switch 58A. The die 12 (FIGURE 1) thus moves to the die-closing position, even though the die start button 64 is released, provided, however, that the safety start button 62 is retained in its actuated condition. When the die is closed, the button 62 may be released since the switch 68 is now closed, resulting in energization of relay coil 90 through a circuit which includes source 84, coil 90 and switch 68. This results in the closure of the relay switches 90A and 90B. Switch 90A short-circuits the safety start switch 62A and switch 90B short-circuits the safety start switch 62C to lock the die in its closed position after which the shot is ladled, the shot piston switch 68 (FIGURES 1 and 2) is actuated as explained previously to effect a timing operation after which the switch 58A is opened. Opening of switch 58A results in de-energization of the relay coil 88 and de-energization of solenoid 52 and the die opening solenoid may be energized by a time-controlled switch 110 in the manner as described above in connection with FIGURE 2.

Should the safety start button 62 be released prior to full closure of the die, the movable die member 12 is returned to its fully open position since in such case the die closing solenoid 74 is energized through a circuit which includes the then closed switch 41C, safety start switch 62D and switch 66, necessitating another two-handed operation for closing the die, particularly since opening of safety switch 62A results in interruption of current to the relay coil 88.

Prior to full closure of the die in its die-closing movement, the die 12 may optionally be returned to its fully open position by operating the reset button 120 which in turn establishes an energizing circuit for solenoid 74 through reset switch 124 and switch 66; also, the emergency stop switch 86 is opened to interrupt the current to die close solenoid 52; and when the die 12 moves to its fully open position, switch 41C is opened.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a control system wherein it is desired to move a member from a first position to a second position, a timed switch; a pair of manually operable switching means; means effective upon manual operation of either one of said switches for initiating the timing of said timed switch; current-responsive means; an energizing circuit for said current-responsive means comprising a series circuit which includes: said timed switch, one of said switching means; a circuit closed in response to energization of said current-responsive means through said series circuit for short-circuiting that portion of said series circuit which includes said timed switch and said one switching means; said circuit including the other one of said switching means and comprising a holding circuit for maintaining flow of current through said current-responsive means regardless of the condition of said timing switch and said one switching means; a member; means for moving said member from a first position to a second position; and means effective upon simultaneous energization of said current-responsive means and operation of said other switching means for operating said moving means.

2. In a control system of the character described wherein it is desired to move a member from a first position to a second position, a timed relay having a coil and a normally open switch actuated thereby; means associated with said relay for delaying the opening of said switch when said coil is de-energized; a first manually operable element having a plurality of switches actuated thereby; a second manually operable element having a plurality of switches operated thereby; an energizing circuit for said timed relay comprising a series circuit which includes: the coil of said timed relay, a first normally closed switch operable by said first element and a first normally closed switch operable by said second element; a second relay having a coil and a switch operated thereby; an energizing circuit for said coil of said second relay comprising a series circuit which includes: said coil of said second relay, said switch of said timed relay and a normally open switch operable by said second element; a member; means for moving said member from said first position to said second position; an energizing circuit for said moving means comprising a series circuit which includes: said switch operated by said coil of said second relay and a second normally open switch operable by said first element; a second energizing circuit for said coil of said second relay comprising a series circuit which includes: said coil of said second relay, said switch operated by said coil of said second relay and a third switch operable by said first element; said switch of said second relay and said third switch operated by said first element serving to short-circuit the series circuit which comprises said switch operated by said timing relay and said second switch operated by said second element.

3. In a control system wherein it is desired to move a member from a first position to a second position; a member; current-responsive means for moving said member from said first position to said second position; a timed relay having a coil and a normally open switch actuated thereby; means associated with said relay for delaying the opening of said switch when said coil is de-energized; a first manually operable element having a plurality of switches actuated thereby; a second manually operable element having a plurality of switches actuated thereby; an energizing circuit for said timed relay comprising a series circuit which includes: said coil of said timed relay, a first normally closed switch operable by said first element and a first normally closed switch operable by said second element; a second relay having a coil and switching means operated thereby; an energizing circuit for said coil of said second relay comprising a series circuit which includes: said coil of said second relay, said switch of said timed relay and a second switch operable by said second element; said switching means when operated by said coil of said second relay serving for short-circuiting a series circuit which comprises: said switch of said timed relay and said second switch operable by said second element; an energizing circuit for said moving means comprising a series circuit which includes: said current-responsive means, switching means operated by the coil of said second relay and a second switch operable by said first element; and a third normally open switch operable by said first element through which the energizing current for said coil of said second relay flows when said first element is operated and said coil of said second relay is energized.

4. A system as set forth in claim 3 in which said switching means operated by said coil of said second relay comprises a single normally open switch through which energizing current for the coil of said second relay flows and through which the energizing current for said current-responsive means flows when said first element is actuated and when said second coil of said second relay is energized.

5. A system as set forth in claim 3 in which said switching means comprises three switches, one of said three switches being connected in shunt with said switch of said timed relay for short-circuiting the same; a second one of said three switches being connected in shunt with said second switch operable by said second element for short-circuiting the same; and the third one of said three switches being connected in a series circuit which includes: said second switch operable by said first element and said current-responsive means.

6. A system as set forth in claim 3 in which said member comprises a platen of a die casting machine, second current-responsive means for moving said platen from said second position to said first position, and means effective to energize said second current-responsive means when said first element is released prior to said member assuming said second position, the last mentioned means comprising a normally open switch operable by said first element and connected in series with said second current-responsive means.

7. A system as set forth in claim 3 in which said member is a platen of a die casting machine, an ejector element movable with respect to said platen and means operated by said platen for controlling the energization of said current-responsive means.

8. A system as set forth in claim 6 including means for rendering said second current-responsive means in effect when said platen assumes said second position.

References Cited in the file of this patent
UNITED STATES PATENTS

| | | |
|---|---|---|
| 2,522,134 | Sayre | Sept. 12, 1950 |
| 2,739,349 | Strauss | Mar. 27, 1956 |
| 2,882,456 | Koch | Apr. 14, 1959 |